May 5, 1970   F. S. MILLS   3,510,420
POLAROGRAPHIC CELL WITH COMPOSITE ELECTRODE-DIFFUSION MEDIUM
Filed April 24, 1967

INVENTOR.
FRANK S. MILLS
BY
ATTORNEY

United States Patent Office 3,510,420
Patented May 5, 1970

3,510,420
POLAROGRAPHIC CELL WITH COMPOSITE
ELECTRODE-DIFFUSION MEDIUM
Frank S. Mills, Minneapolis, Minn., assignor to
Honeywell Inc., Minneapolis, Minn., a corporation of Delaware
Filed Apr. 24, 1967, Ser. No. 633,056
Int. Cl. G01n 27/54; B01k 3/04
U.S. Cl. 204—195                              8 Claims

ABSTRACT OF THE DISCLOSURE

A composite electrode-diffusion medium, for use with electrochemical cells particularly of the polarographic oxygen sensing type, consisting of a selectively permeable polytetrafluoroethylene membrane containing a microapertured layer of gold particles.

BACKGROUND OF THE INVENTION

This invention is particularly concerned with the improvement of electrochemical cells of the type used to determine the proportionate amounts of a gas dissolved in a liquid or another gas. More specifically, this invention is concerned with an improved construction for such cells utilizing a novel composite electrode-selectively permeable diffusion medium. Selectively permeable diffusion media are typically used with polarographic cells of the type disclosed in U.S. Pats. 2,913,386; 3,000,805, and 3,239,444. Polarographic cells generally, and the cells of the aforementioned patent specifically, include an electrolyte, a polarizing electrode and a reference electrode. Typically the reference electrode is silver-silver chloride, the polarizing electrode is gold or platinum and the electrolyte is an aqueous solution of potassium chloride. As can be seen from these patents, polarographic cells have found wide use in oxygen sensing and measuring. While the present invention is applicable to the determination of the concentration or proportional amounts of a number of reactive gases in a variety of liquids and other gas admixtures, the discussion which follows will be limited to a description of the operation of this invention in the determination of oxygen in a liquid or a gas. However, it should be understood that other reactive gases, such as chlorine, bromine, sulfur dioxide, etc. can be determined using the present invention and that other liquids and gases containing the gas to be determined may be similarly analyzed.

The selectively permeable diffusion media utilized in prior art polarographic oxygen sensors has been for the most part a thin membrane of a material such as polyethylene or rubber. These prior art diffusion media (typically disclosed in the aforementioned U.S. Pats. 2,913,386 and 3,000,805) have been satisfactory to a degree. However, the delicate nature of these membranes has been found to be a handicap due to the ease with which they can be accidentally penetrated by foreign objects, thus resulting in undesirable leakage. Furthermore, thin membranes alone are quite flexible and susceptible to cold flow. In consequence, changes in membrane tension occur which have been found to affect the stability of the cell response and which give rise to undesirable background noises. Also, the tension of the membrane must be adjusted to relatively narrow limits. If the tension is too high, the path into the cell is "pinched off"; if the tension is too low, the membrane tends to flex causing undesirable electrical noise.

One solution to some of these problems has been to vacuum deposit one of the cell electrodes onto a surface of the membrane in the form of a thin metallic layer as shown in the aforementioned U.S. Pat. 3,239,444. This approach removes the spacing problems inherently contained in the other aforementioned prior art devices wherein the membrane is separated from one of the electrodes by a predetermined distance which may be undesirably increased or decreased by changes in internal or external pressure. By using a very thin layer of electrode material on the interiorly exposed surface of the membrane the electrode inescapably moves with the membrane and the problem of distance variation disappears. However, the resulting structure is extremely delicate mechanically in that the electrode material has been found to lack adherence to the membrane. Such electrode-membrane structures have therefore been found to have very short lifetimes, in the order of a few months. In some cases, adhesives have been used to hold the electrode material to the membrane. However, adhesives have been found to seriously impede oxygen diffusion through the diffusion media and otherwise interfere with the electrode reaction which takes place in the cell at the exposed face of the electrode-membrane.

SUMMARY

The foregoing problems have been obviated by this invention which provides an improved composite electrode-diffusion medium. The improved composite electrode-diffusion medium takes the form of a diffusion medium body composed of a selectively permeable nonconductive material which in its preferred form is a membrane or film. The body is further characterized in having a zone or surface portion which is filled to a conductive state with a plurality of discrete metallic particles. The particles are present in a high enough concentration to render the filled zone electrically conductive so that it can function as an electrode, yet there are a number of microapertures or interstices left between some of the particles to allow diffusion of the electrolyte.

In the composite electrode-diffusion medium thus provided, the filled zone adds a certain amount of rigidity to the structure thus minimizing the tensioning problems and the delicate nature of the diffusion media utilized in the prior art. Also, since the particles are impregnated into the diffusion medium material rather than being adhered to a surface thereof in the form of a thin metallic layer or film, the adhesion problems presented by the aforementioned prior art solutions are also obviated. Furthermore, the composite possesses excellent gas transport properties, chemical and heat resistance and electrical properties, all of which provide in combination with an electrochemical cell a vastly improved sensing apparatus.

DESCRIPTION OF THE PREFERRED EMBODIMENTS

Figure 1:
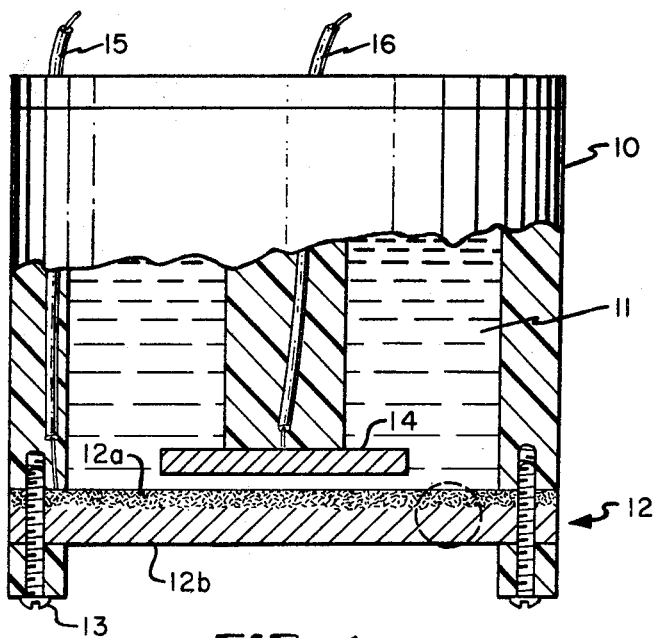
FIG. 1 is a schematic representation, partially in cross section, representing an oxygen sensor utilizing the improved composite electrode-diffusion medium provided by the present invention.

In FIG. 1 there is illustrated an electrochemical cell for determining the concentration of oxygen in a liquid or a gas. The cell comprises a cylindrical body 10 which provides a chamber 11 containing an electrolyte such as 0.1 N KCl in water. An opening is provided at the lower end of body 10 which communicates with the interior of chamber 11 and the electrolyte contained therein. Across the opening is a composite electrode-diffusion medium body 12 which is selectively permeable to allow diffusion therethrough of the gas being detected, in this case oxygen. Retaining means 13 is provided to maintain the diffusion medium body in position. Electrode 12a is carried by diffusion medium body 12. Electrode 12a is shown exposed to the interior chamber 11 and the electrolyte contained therein. Another electrode 14 (typically silver metal—with a silver chloride film) is located in chamber 11 and is spaced a small distance from electrode 12a. The electrodes are electrically contacted by leads 15 and 16.

Figure 2:
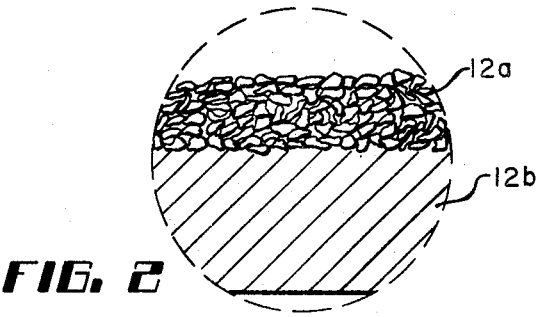
FIG. 2 is an enlarged fragmentary view of the composite structure taken as indicated in FIG. 1 by the circled portion 12.

As is shown in FIG. 1 and more particularly in FIG. 2, electrode 12a is formed of a plurality of discrete metallic particles which are impregnated into diffusion medium body 12 to form an electrically conductive zone or surface layer in body 12. The particles also provide a plurality of micro-apertures in body 12 to allow diffusion therethrough. Only one zone of the diffusion medium body 12 is filled with the metallic particles; the other zone 12b remaining substantially free of the particles. Electrode 12a may be of any suitable metal; however, the noble metals such as platinum and in particular gold have been found to provide the most trouble-free electrode materials since they do not corrode. The diffusion medium body itself may consist of a variety of materials. For example, plastics such as polyethylene, polytetrafluoroethylene, copolymers of fluoroethylene and fluoropropylene, porous vinyl resin polymers and polyvinyl chloride polymers are satisfactory. Also, silicone rubber, impregnated glass cloth and the like may be used. The thickness of the diffusion medium body may be varied as desired over a wide range depending on the material used.

A thickness of 0.001 to 0.010 inch in the case of polytetrafluoroethylene provides a suitable strong diffusion medium body and one that is sufficiently thin to allow rapid oxygen diffusion and therefore high depolarization current and also rapid response to changes in oxygen concentration in the liquid or gas being tested. A preferred thickness for this particular material has been found to be 0.002 inch. Such a thickness places the preferred form of the diffusion medium body of this invention in the classification of a membrane or film.

Figure 3:
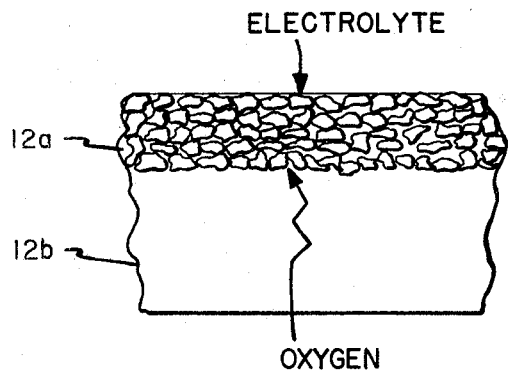
FIG. 3 is a schematic showing of diffusion in a composite electrode-diffusion medium prepared in accordance with this invention.

It is important to note that in connection with the improved diffusion medium body according to this invention, the metallic particles are dispersed or impregnated throughout only a zone or surface portion of the diffusion medium body as shown in FIGS. 1, 2, and 3. It has been found that metallic particles dispersed generally throughout the entire body as shown in FIG. 4 have undesirable properties.

The selectively permeable diffusion media materials utilized in the electrochemical cells described herein allow diffusion of the gas being sensed but are not substantially permeable to the electrolyte. For example, polytetrafluoroethylene is permeable to oxygen but not to a KCl solution. However, when filled with discrete particles, the diffusion material contains micro-apertures or interstices between the particles through which the electrolyte may diffuse. Therefore, if the diffusion medium body is generally filled throughout as shown in FIG. 4, the electrolyte may diffuse completely through the body. Leakage problems result and the electrical properties of the cell are detrimentally affected.

In the improved configuration in accordance with this invention as shown in FIG. 3 only one zone or surface portion is filled. Oxygen diffuses through the diffusion medium 12b and reacts at the active metallic sites in the presence of the electrolyte which may be present as a fluid on surface metallic particles or diffused into the diffusion medium body 12 only in the portion containing the discrete particles. Since the particles do not extend throughout the body, diffusion of the electrolyte throughout is prohibited.

Figure 4:
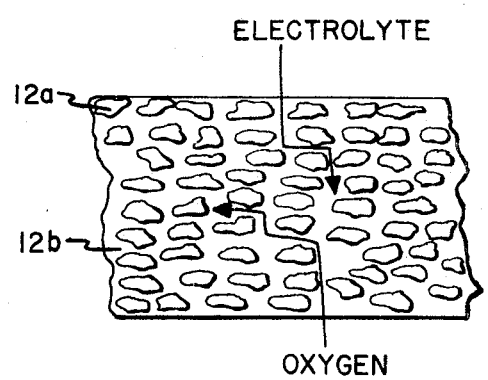
FIG. 4 is a schematic showing of a composite electrode-diffusion medium wherein the filled particles are generally distributed throughout the entire diffusion medium body.

The generally dispersed metallic particle configuration shown in FIG. 4 allows diffusion of electrolyte and oxygen generally throughout the entire diffusion medium body. In operation and under steady state conditions in air the resultant operating current is higher than the configuration of the invention due to the effectively thinner diffusion membrane for oxygen. When there is very little oxygen present, there is a relatively large amount of electrolyte able to diffuse to the reactive sites and a surplus of electrolyte accumulates. When the cell is shifted to a high oxygen atmosphere an abnormal surge of current results until the surplus of electrolyte is consumed and equilibrium is again restored. This slow attainment of equilibrium current is another reason for preferring the configuration in accordance with the present invention over the generally dispersed configuration shown in FIG. 4.

A preferred embodiment of the diffusion medium of this invention is prepared by pressing gold particles into a polytetrafluoroethylene membrane 0.001 inch in thickness. Gold powder, 325–400 mesh or finer, is sprinkled on a surface of the membrane to form a continuous layer. The membrane is placed in a press. It is then pressed to 1500–3000 p.s.i. and heated to 500–600° F. This method has been found to provide a particularly improved and satisfactory composite electrode-selectively permeable diffusion medium for use with electro-chemical cells. Of course, the filled configuration may also be obtained by molding procedures.

The embodiments of the invention in which an exclusive property or right is claimed are defined as follows:

1. A polarographic cell adapted to be used in the determination of the concentration of an oxidizing gas dispersed in a fluid comprising:
   (a) a first body defining a chamber with an opening across at least a portion of one surface of the chamber,
   (b) a reference electrode contained within said chamber in gas tight isolation, other than by said opening, from the environment external to said chamber,
   (c) a gas permeable composite electrode-membrane member in generally sheet form in liquid tight engagement with said opening in said chamber, said member comprising two zones, the first zone including one face region of said member and consisting of a gas permeable non-conductive material facing exteriorly to said chamber, the second zone including the opposite face region of said member and consisting of said material filled with metallic particles to provide electrical conductivity and containing micro apertures to permit an electrolyte solution to penetrate and contact at least a portion of said metallic particles,
   (d) an electrolyte solution in said cell in electrical contact with said reference electrode and with said composite electrode-membrane material.

2. The electrochemical cell of claim 1 wherein said material is a plastic material.

3. The electrochemical cell of claim 1 wherein said metallic particles are of a noble metal.

4. The electrochemical cell of claim 1 wherein said material is polytetrafluoroethylene.

5. The electrochemical cell of claim 4 wherein said metallic particles are gold.

6. The electrochemical cell of claim 5 wherein said membrane has a thickness ranging from about 0.001 to about 0.010 inch.

7. The electrochemical cell of claim 5 wherein said membrane is about 0.002 inch thick.

8. The electrochemical cell of claim 7 wherein the reference electrode is a silver-silver chloride electrode and the electrolyte is 0.1 N KCl.

References Cited

UNITED STATES PATENTS

| | | | |
|---|---|---|---|
| 3,134,697 | 5/1964 | Niedrach | 136—86 |
| 3,239,444 | 3/1966 | Heldenbrand | 204—195 |
| 3,328,204 | 6/1967 | Grubb. | |
| 3,382,105 | 5/1968 | McBryar et al. | 136—86 |
| 3,394,069 | 7/1968 | Solomons | 204—195 |

TA HSUNG TUNG, Primary Examiner

U.S. Cl. X.R.

204—283, 284; 136—86